United States Patent [19]

Harris

[11] Patent Number: 4,847,350

[45] Date of Patent: Jul. 11, 1989

[54] PREPARATION OF AROMATIC HETEROCYCLIC POLYMERS

[75] Inventor: William J. Harris, Midland, Mich.

[73] Assignee: The Dow Chemical Company, Midland, Mich.

[21] Appl. No.: 868,396

[22] Filed: May 27, 1986

[51] Int. Cl.$^4$ .................. C08G 63/06; C08G 69/44; C08G 63/68

[52] U.S. Cl. .................. 528/179; 528/183; 528/185; 528/207; 528/208; 528/286; 528/289; 528/290; 528/291; 528/336; 528/337

[58] Field of Search .............. 528/179, 183, 185, 207, 528/208, 286, 289, 290, 291, 336, 337

[56] References Cited

U.S. PATENT DOCUMENTS

| | | | |
|---|---|---|---|
| 4,423,202 | 12/1983 | Choe | 528/377 |
| 4,533,692 | 8/1985 | Wolfe et al. | 528/183 |
| 4,533,693 | 8/1985 | Wolfe et al. | 524/417 |
| 4,606,875 | 8/1986 | Chenevey et al. | 264/85 |
| 4,772,678 | 9/1988 | Sybert et al. | 528/179 |

OTHER PUBLICATIONS

Ueda et al., *J. Polymer Science, Part A, Polymer Chemistry,* vol. 24, 1019–1026 (1986).

Ueda et al., *Makromol. Chem., Rapid Commun.,* vol. 6, 271–274 (1985).

Ueda et al., *Makromol. Chem., Rapid Commun.,* vol. 5, 833–836 (1984).

*Primary Examiner*—John Kight
*Assistant Examiner*—M. L. Moore

[57] ABSTRACT

Rapid process for the formation of heterocyclic aromatic polymers by contacting one or more appropriate multifunctional aromatic compounds, such as a diaminobenzenediol, a terephthaloyl halide and/or an aminohydroxybenzoic acid, with a sulfonic acid and a dehydrating agent.

20 Claims, No Drawings

PREPARATION OF AROMATIC HETEROCYCLIC POLYMERS

BACKGROUND OF THE INVENTION

This invention relates to the preparation of aromatic heterocyclic polymers. More specifically, it pertains to a process for the formation of rigid-rod aromatic heterocyclic polymers.

Aromatic heterocyclic polymers exhibit excellent tensile strength and thermal stability and are useful for military, aerospace and other applications requiring rigid and environmentally stable materials. U.S. Pat. Nos. 4,533,692; 4,533,693; 4,533,724 and 4,423,202 describe a method of producing heterocyclic aromatic polymers in a polyphosphoric acid solvent. This method basically involves the addition of a monomer to polyphosphoric acid with subsequent heating and optionally a reduction in pressure. A second monomer and phosphorous pentoxide are then added to the mixture to promote polymerization. In order to form a hetercyclic polymer, at least one monomer must be amino-substituted and is usually in the form of a hydrohalide salt. The high viscosity of the polyphosphoric acid hinders the release of hydrohalide from the amino-substituted monomer and prolongs the process over a period of several days. The highly viscous polyphosphoric acid also causes foaming and delays the formation of a homogeneous solution.

In view of the problems associated with current methods of aromatic heterocyclic rigid-rod polymer production, an improved process is needed that would minimize reaction time, reduce undesirable foaming and hasten the formation of a homogeneous solution.

SUMMARY OF THE INVENTION

The present invention is such an efficient and rapid process that provides for the preparation of rigid-rod aromatic heterocyclic polymers via contacting a sulfonic acid, as a solvent, with one or more multifunctional aromatic monomers under reaction conditions such that an aromatic heterocyclic polymer is produced. Surprisingly, the use of a sulfonic acid in lieu of the traditional polyphosphoric acid provides for a very rapid elimination of hydrohalide from the amino-substituted monomer and a hastened formation of a homogeneous solution. Further advantages of the present process include minimal foaming and lower bulk viscosity throughout the reaction sequence.

DETAILED DESCRIPTION OF THE INVENTION

The process of the present invention requires a sulfonic acid and one or more multifunctional aromatic compounds. Multifunctional aromatic compound or monomer herein refers to an aromatic compound having two acylhalo groups or three to four active hydrogen moieties. Acylhalo herein refers to

where X is chloro, bromo, iodo or fluoro. For the purposes of this invention, an active hydrogen moiety refers to a moiety containing a hydrogen atom which, because of its position in the molecule, displays significant activity according to the Zerewitnoff test described by Woller in the *Journal of American Chemical Society*, 49, 3181 (1927). Illustrative of such active hydrogen moieties are —COOH, —OH, —NH$_2$, —NHC$_6$H$_5$ and —SH.

The multifunctional aromatic compounds function as monomers in the process of the present invention and are of three general types. The multifunctional aromatic monomers will be classified herein as Types A, B and C. The majority of the Type A monomers can be represented by the general formula:

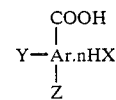

wherein Ar is benzene or biphenyl; Y and Z can be OH, SH, NH$_2$, NHC$_6$H$_5$ with the proviso that Y or Z must be NH$_2$ or NHC$_6$H$_5$ and Y and Z can be the same only in the case of NH$_2$. Y and Z are always ortho with respect to one another and in the case of biphenyl, COOH is not on the same ring as Y and Z. The variable n is one in all cases except that n is 2 when Y and Z are both NH$_2$. X can be Cl, Br, F or I.

Other Type A monomers not represented by the above formula include those classified as Type 3 in U.S. Pat. No. 4,533,692. U.S. Pat. No. 4,533,692 is hereby incorporated by reference.

Examples of typical Type A monomers include the hydrohalides of the following compounds: 3-hydroxy-4-aminobenzoic acid, 3-amino-4-hydroxybenzoic acid, 3-mercapto-4-aminobenzoic acid, 3-amino-4-mercaptobenzoic acid, 3,4-diaminobenzoic acid, N-4-phenyl-3-hydroxy-4-aminobenzoic acid, 4-carboxy-3'-amino-4'-hydroxydiphenyl, 4-carboxy-3', 4'-diaminodiphenyl, and 4-carboxy-3'-mercapto-4'-aminodiphenyl. Preferred Type A monomers include 3-amino-4-hydroxybenzoic acid, 3-hydroxy-4-aminobenzoic acid, and 4-carboxy-3'-amino-4'-hydroxydiphenyl. The most preferred Type A monomer is 3-amino-4-hydroxybenzoic acid.

The majority of the Type B monomers can be represented by the general formula:

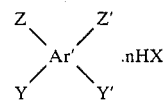

wherein Ar' is benzene, diphenyl ether, diphenyl sulfone, biphenyl or naphthalene. Y, Z, Y' and Z' can be OH, SH, NH$_2$, NHC$_6$H$_5$ with the proviso that at least two NH$_2$ groups are present, one being either Y or Z and the other being either Y' or Z'. Y and Z are always ortho with respect to one another as are Y' and Z'. In the case of a double ring system, such as biphenyl, Y and Z are not on the same ring as Y' and Z'. The variable n corresponds to the number of NH$_2$ groups present and X is as defined above.

Other suitable Type B monomers which are not represented by the above formula include those classified as Type 1 in U.S. Pat. No. 4,533,692.

Examples of Type B monomers include the hydrohalides of the following compounds: 2,5-diamino-1,4-benzenediol, 4,6-diamino-1,3-benzenediol, 4,6-diamino-1,3-benzenedithiol, 2,5-diamino-1,4-benzenedithiol, 1,2,4,5-tetraaminobenzene, 3,3'-dihydroxy-4,4'-diaminodiphenyl ether, 3,3',4,4'-tetraaminodiphenyl sulfone, 3,3'-diaminobenzidine and 1,5-diamino-2,6-naphthalenediol. Preferred Type B monomers include 4,6-diamino-1,3-benzenediol, 2,5-diamino-1,4-benzenediol, 3,3'-dihydroxy-4,4'-diaminodiphenylether and 1,5-diamino-2,6-napththalenediol. The most preferred Type B monomer is 4,6-diamino-1,3-benzenediol.

The majority of the Type C monomers can be represented by the general formula:

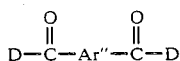

wherein Ar" is benzene, biphenyl or naphthalene and D can be OH, Cl, Br, I or F.

Other suitable Type C monomers not represented by the above formula include those classified as Type 2 in U.S. Pat. No. 4,533,692.

Examples of suitable Type C monomers include terephthalic acid, terephthaloyl chloride, isophthalic acid, 4,4'-dicarboxydiphenyl ether, 4,4'-diphenyldicarboxylic acid, 4,4'-diphenyldicarboxylic acid chloride, 2,6-naphthalenedicarboxylic acid and 2,6-naphthalenedicarboxylic acid chloride. Preferred Type C monomers include terephthaloyl chloride, terephthalic acid, 4,4'-diphenyldicarboxylic acid chloride and 2,6-napthalenedicarboxylic acid chloride. The most preferred Type C monomer is terephthaloyl chloride.

All of the aforementioned Type A, B and C monomers can be prepared according to specific methods disclosed in U.S. Pat. No. 4,533,692. Each monomer constitutes from about 0.1 weight percent to about 50 weight percent of the total reaction mixture, with the preferred amounts ranging from about 1 to about 40 weight percent. The most preferred amounts range from 3 to 35 weight percent. Generally, lesser amounts of each monomer are employed when a combination of monomer types is utilized.

A sulfonic acid is advantageously employed in the process of the present invention. Any sulfonic acid which will be a liquid at temperatures less than 200° C. and does not boil at temperatures less than 100° C. can be utilized in the present process. Typical sulfonic acids include methanesulfonic acid, benzenesulfonic acid, ethanesulfonic acid, toluenesulfonic acid, propanesulfonic acid and chlorosulfonic acid. Preferred sulfonic acids include methanesulfonic acid, benzenesulfonic acid and ethanesulfonic acid. The most preferred sulfonic acid is methanesulfonic acid. The sulfonic acid of the present invention functions as a solvent and is employed in an amount sufficient to dehydrohalogenate the monomers. Typically, the amount of sulfonic acid constitutes from about 3 weight percent to about 98 weight percent of the total reaction mixture with the preferred amounts being in the range from 5 to 80 weight percent. The most preferred amounts are in the range from 10 to 50 weight percent. Generally, higher amounts of sulfonic acid result in a lower overall bulk viscosity, a more rapid formation of a homogeneous solution and a hastened dehydrohalogenation.

Water is generated by the process of the present invention and should be eliminated as the reaction proceeds. Any known method may be used to eliminate water such as heating or employing a dehydrating agent. The use of a dehydrating agent is the preferred method as loss of solvent may occur with other methods such as heating. Any dehydrating agent may be employed in the process of the present invention which will sufficiently eliminate water under reaction conditions. Dehydrating agents are well-known in the art. See, e.g., *Purification of Laboratory Chemicals*, D. Perrin et al., pp. 21–25. Typical dehydrating agents include phosphorous pentoxide, methanesulfonic anhydride, polyphosphoric acid, boron oxide, phosphorous pentasulfide and mixtures thereof. Preferred dehydrating agents include phosphorous pentoxide, methanesulfonic anhydride and polyphosphoric acid. The most preferred dehydrating agent is phosphorous pentoxide.

The preferred method of carrying out the process of the present invention involves (1) contacting a sulfonic acid as a solvent with one or more appropriate multifunctional aromatic monomers; (2) adding a dehydrating agent and elevating and then sustaining the temperature of the reaction mixture; and (3) elevating further the temperature of the reaction mixture. Type A monomers contain all functional groups necessary for polymerization and may be employed alone. Alternatively, a mixture of a Type B and a Type C monomer may be employed as starting material for the process of the present invention. In addition, a Type A monomer may be employed in combination with a Type B monomer or a Type C monomer or with both a Type B and a Type C monomer. The initial step involves a dehydrohalogenation of the hydrohalide salt of the amino-substituted monomer. In the embodiment involving more than one type of monomer, the first step may involve simultaneous contact of all monomers with the sulfonic acid or a separate addition of each monomer to the sulfonic acid with separate heating periods for each monomer. Following dehydrohalogenation and the addition of the dehydrating agent, the multifunctional aromatic monomers undergo condensation during the final stages of the reaction. A Type A monomer can condense with Type A, B and C monomers while a Type B monomer can condense with Type A and C monomers.

The first step of the process is typically carried out at a temperature between about 25° C. and about 250° C., more preferably between about 25° C. and about 100° C. The reaction time of the first step is between about 1 minute and about 24 hours. Preferable first step reaction times range from 15 minutes to 16 hours. In the case of separate addition of different type monomers, the first step heating period for each monomer is also within the above time ranges in order to ensure complete dehydrohalogenation or solubilization of each monomer.

The second step of the process, which involves the addition of a dehydrating agent, generally is carried out at a temperature between about 25° C. and about 250° C. and more preferably between about 50° C. and about 150° C. The reaction time of the second step typically ranges between about 1 and about 24 hours.

In the final step of the process, the mixture is suitably heated to a temperature between about 100° C. and about 300° C., preferably to between about 100° C. and about 200° C. The reaction time of the final step is typically between about 0.5 hour and about 48 hours.

The reaction of a preferred Type A monomer can be illustrated by the following sequence:

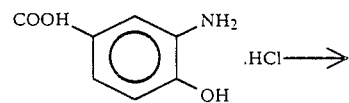

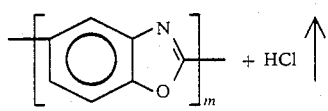

where m represents the number of repeating units in the polymer chain.

The reaction of a preferred Type B and a preferred Type C monomer can be illustrated by the following sequence:

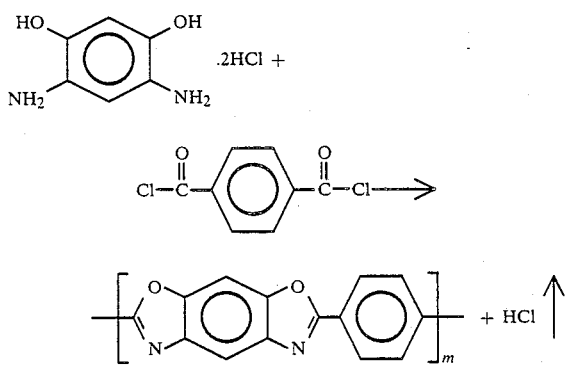

where m is as defined above.

The entire process may be operated at sub- or super-atmospheric pressures although it is preferred to operate at ambient pressure for the sake of convenience. The polymeric product may be recovered using well-known techniques such as, for example, precipitation, extraction, coagulation, devolatilization and crystallization. The polymers produced herein have a ladder-type heterocyclic aromatic structure and are described in U.S. Pat. No. 4,533,692. Preferred polymers produced by the process of the present invention include:

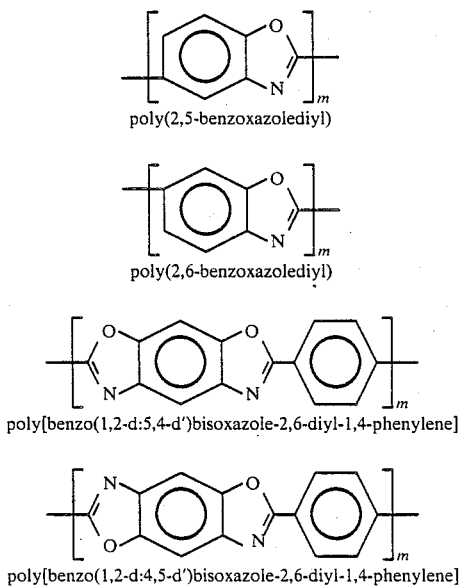

poly(2,5-benzoxazolediyl)

poly(2,6-benzoxazolediyl)

poly[benzo(1,2-d:5,4-d')bisoxazole-2,6-diyl-1,4-phenylene]

poly[benzo(1,2-d:4,5-d')bisoxazole-2,6-diyl-1,4-phenylene]

The final product normally exhibits an intrinsic viscosity of between about 2 $dL/g$ and about 40 $dL/g$.

Surprisingly, the use of a sulfonic acid in the first step of the process of the present invention allows for a rapid dehydrohalogenation of the amino-substituted monomer and substantially reduces the foam normally caused by the release of hydrohalide. The use of a sulfonic acid is therefore advantageous in light of the prior use of the highly viscous polyphosphoric acid which hinders the release of the hydrohalide and causes substantial foaming. To a further advantage, the use of a sulfonic acid lowers the bulk viscosity of the reaction medium throughout the entire process and thereby provides for a more workable medium and hence a more rapid formation of a homogeneous solution.

SPECIFIC EMBODIMENTS

The following examples are given to illustrate the invention and should not be construed as limiting its scope. All parts are by weight unless otherwise specified.

EXAMPLE 1

To a reaction vessel is added 12.0 g of 3-amino-4-hydroxybenzoic acid hydrochloride. The vessel is sealed with a glass stir shaft and paddle and placed under a nitrogen purge. To the vessel is added 15.0 g of distilled methanesulfonic acid with hydrogen chloride rapidly evolving. The vessel is warmed by oil bath for 16 hours at 50° C. with stirring. The solution forms an opaque white liquid. To the resulting liquid is added 15.0 g of phosphorous pentoxide. The vessel is warmed at 90° C. for 24 hours and an opaque yellow, readily stirred liquid is formed. The liquid is warmed at 190° C. for 48 hours. The liquid turns a clear yellow-green then an opaque gray-green with increasing viscosity. The product, poly(2,5-benzoxazolediyl), is isolated by water extraction in a Soxhlet extractor and exhibits an intrinsic viscosity of 17.2 $dL/g$ in methanesulfonic acid at a temperature of 25° C.

EXAMPLE 2

To a reaction vessel in an inert atmosphere and equipped with a glass stir shaft and paddle is added 4.29 g of terephthaloyl chloride. The vessel is sealed, transferred to a hood and placed under a nitrogen purge. To the vessel is then added 13.6 g of methanesulfonic acid with stirring. The vessel is warmed by oil bath for 16 hours at 45° C. The vessel is warmed to 60° C. and 4.5 g of 2,5-diamino-1,4-dihydroxybenzene bishydrochloride is added to the vessel in an inert atmosphere. The mixture is stirred for 24 hours and then warmed to 90° C. To the vessel is added 13.6 g of phosphorous pentoxide followed by stirring for 2 hours. The mixture is held at 150° C. for 2 hours and 190° C. for 24 hours. The product, poly[benzo(1,2-d:4,5-d')-bisoxazole-2,6-diyl-1,4-phenylene], is isolated by water extraction in a Soxhlet extractor and exhibits an intrinsic viscosity of 8.3 $dL/g$ in methanesulfonic acid at a temperature of 25° C.

What is claimed is:

1. A process comprising contacting a sulfonic acid, as a solvent, with one or more multifunctional aromatic monomers under reaction conditions sufficient to form an aromatic heterocyclic polymer.

2. The process of claim 1 wherein the process steps comprise (1) contacting a sulfonic acid, as a solvent, with one or more multifunctional aromatic monomers; (2) adding a dehydrating agent and elevating and then sustaining the temperature of the reaction mixture; and (3) elevating further the temperature of the reaction mixture.

3. The process of claim 2 wherein the multifunctional aromatic monomer is a Type A monomer corresponding to the general formula:

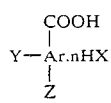

wherein Ar is benzene or biphenyl; Y and Z can be OH, SH, $NH_2$ or $NHC_6H_5$ with the proviso that Y or Z must be $NH_2$ or $NHC_6H_5$ and Y and Z can be the same only in the case of $NH_2$, Y and Z are always ortho with respect to one another and in the case of biphenyl, COOH is not on the same ring as Y and Z; the variable n is one in all cases except that n is 2 when Y and Z are both $NH_2$; X can be Cl, Br, F or I.

4. The process of claim 3 wherein the multifunctional aromatic monomer is any Type A monomer.

5. The process of claim 2 wherein the multifunctional aromatic monomers consist of a Type B monomer corresponding to the formula:

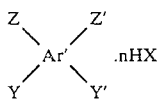

and a Type C monomer corresponding to the formula:

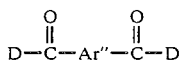

wherein Ar' is benzene, diphenyl ether, diphenyl sulfone, biphenyl or naphthalene; Y, Z, Y' and Z' can be OH, SH, $NH_2$ or $NHC_6H_5$ with the proviso that at least two $NH_2$ groups are present, one being either Y or Z and the other being either Y' or Z'; Y and Z are always ortho with respect to one another as are Y' and Z'; in the case of a double ring system, such as biphenyl, Y and Z are not on the same ring as Y' and Z'; the variable n corresponds to the number of $NH_2$ groups represent; X can be Cl, Br, F or I; Ar" is benzene, biphenyl or naphthalene; and D can be OH, Cl, Br, I or F.

6. The process of claim 5 wherein the multifunctional aromatic monomers are any Type B and any Type C monomers.

7. The process of claim 5 wherein the multifunctional aromatic monomers consist of a Type A, or Type B and a Type C monomer.

8. The process of claim 3 wherein the Type A monomer is 3-amino-4-hydroxybenzoic acid hydrochloride, 3-hydroxy-4-aminobenzoic acid hydrochloride, 3-mercapto-4-aminobenzoic acid hydrochloride or 3-amino-4-mercapto-4-benzoic acid hydrochloride.

9. The process of claim 3 wherein the Type A monomer is 3-amino-4-hydroxybenzoic acid hydrochloride.

10. The process of claim 9 wherein the sulfonic acid is methanesulfonic acid.

11. The process of claim 10 wherein the dehydrating agent is phosphorous pentoxide.

12. The process of claim 5 wherein the Type B monomer is 2,5-diamino-1,4-benzenediol bishydrochloride, 4,6-diamino-1,3-benzenediol bishydrochloride, 2,5-diamino-1,4-benzenedithiol bishydrochloride or 4,6-diamino-1,3-benzenedithiol bishydrochloride and the Type C monomer is terephthalic acid, terephthaloyl chloride, isophthalic acid or isophthaloyl chloride.

13. The process of claim 5 wherein the Type B monomer is 2,5-diamino-1,4-benzenediol bishydrochloride.

14. The process of claim 13 wherein the Type C monomer is terephthaloyl chloride.

15. The process of claim 14 wherein the sulfonic acid is methanesulfonic acid.

16. The process of claim 15 wherein the dehydrating agent is phosphorous pentoxide.

17. The process of claim 15 wherein the dehydrating agent is polyphosphoric acid.

18. The process of claim 7 wherein the Type A monomer is 3-amino-4-hyroxybenzoic acid hydrochloride, the Type B monomer is 2,5-diamino-1,4-benzendiol bishydrochloride and the Type C monomer is terephthaloyl chloride.

19. A process for the preparation of poly(2,5-benzoxazolediyl) comprising (1) contacting methanesulfonic acid and 3-amino-4-hydroxybenzoic acid for between about 0.2 hour and about 16 hours at a temperature between about 20° C. and about 50° C.; (2) adding phosphorous pentoxide to the mixture of (1) and elavating to and then sustaining the temperature of the reaction mixture at between about 80° C. and about 100° C. for between about 1 hour and about 24 hours; and (3) elevating further the temperature of the reaction mixture to between about 140° C. and about 200° C. and sustaining the elevated temperature for between about 4 hours and about 48 hours.

20. A process for the preparation of poly[benzo(1,2-d:4,5-d')bisoxazole-2,6-diyl-1,4-phenylene] comprising (1) contacting methanesulfonic acid, 2,5-diamino-1,4-benzenediol bishydrochloride and terephthaloyl chloride for between about 1 hour and about 40 hours at a temperature between about 20° C. and about 90° C.; (2) adding phosphorous pentoxide to the mixture of (1) and elevating to and then sustaining the temperature of the reaction mixture at between about 80° C. and about 100° C. for between about 1 hour and about 24 hours; and (3) elevating further the temperature of the reaction mixture to between about 140° C. and about 200° C. and sustaining the elevated temperature for between about 1 hour and about 48 hours.

* * * * *